(12) United States Patent
Grabbe

(10) Patent No.: US 6,213,753 B1
(45) Date of Patent: Apr. 10, 2001

(54) MOLD APPARATUS

(75) Inventor: Dimitry Grabbe, Middletown, PA (US)

(73) Assignee: The Whitaker Corporation, Wilmington, DE (US)

( * ) Notice: Subject to any disclaimer, the term of this patent is extended or adjusted under 35 U.S.C. 154(b) by 0 days.

(21) Appl. No.: 09/164,479

(22) Filed: Oct. 1, 1998

Related U.S. Application Data

(60) Provisional application No. 60/093,976, filed on Jul. 24, 1998.

(51) Int. Cl.[7] .................................................... B29C 33/04
(52) U.S. Cl. ...................... 425/192 R; 425/195; 425/234; 425/236; 425/556; 425/330; 425/438; 425/443; 425/436 RM; 425/DIG. 58
(58) Field of Search .............................. 425/192 R, 234, 425/236, 195, 443, 190, 441, 556, 577, DIG. 30, 330, DIG. 58, 436 RM, 438, 554; 264/243

(56) References Cited

U.S. PATENT DOCUMENTS

| | | | |
|---|---|---|---|
| 2,664,593 | * | 1/1954 | Larson .................................. 425/195 |
| 4,706,924 | * | 11/1987 | de Larosiere ........................ 249/161 |
| 5,217,728 | * | 6/1993 | Grabbe ................................. 425/443 |

* cited by examiner

*Primary Examiner*—Harold Pyon
*Assistant Examiner*—Joseph S. Del Sole

(57) ABSTRACT

This invention provides a method of forming a mold (20) including the steps of segmenting a surface to be molded into discrete adjacent linear sections, forming a profile of each section on an edge of a planar material to define a plurality of blades (30, 40, 50), and; stacking each blade (30, 40, 50) such that their profiled mold edges (34, 44, 54) together form the surface to be molded. The blades (30, 40, 50) are secured in a mold body (20) and selected ones of the blades (30, 40, 50) may be articulated to eject the molded article from the mold (20).

7 Claims, 5 Drawing Sheets

MOLD APPARATUS

This application claims benefit to provisional application No. 60/093,976.

FIELD OF THE INVENTION

This invention is related to molding, and more particularly to an improved mold and a method of forming the mold.

BACKGROUND OF THE INVENTION

Molds used to form plastic parts such as electrical connector housings and other articles are generally formed by machining a pair of mold plates resulting in a negative image of the surfaces to be molded. Electrical connector sockets frequently have flat surfaces populated with large numbers of apertures for receiving electrical contacts. Molds for such parts may have several thousand openings formed in the mold parts to receive core pins around which plastic may be formed. The core pins result in recesses or openings formed in the article to be molded. The mold plates are then placed and secured into opposed mold holders or frames. The pair of mold holders are held together and molten material is injected therebetween to form the molded article. The mold holders are then separated to eject the molded article from the mold. Forming of the mold plates is typically a labor intensive process since a negative image of the article to be molded and a large number of core pins must be precisely machined into the surface of the plate.

A problem exists with the present method of making molds in that forming of the mold plate and the multitude of core pins is a labor intensive precision machining process. It is therefore desirable to simplify the process of creating a mold in a precise manner without the need for a labor intensive process and without the individual core pins.

SUMMARY

It is therefore an object of the present invention to provide a method of making a mold which reduces the labor intensity and skill required to form the mold. It is yet another object of the present invention to provide a mold which can be accurately formed without the need for a labor intensive machining process.

This invention provides a method of forming a mold including the steps of segmenting a surface to be molded into discrete adjacent sections, forming a profile of each section on an edge of a planar or arcuate material, and; stacking each profile such that their edges form the surface to be molded.

BRIEF DESCRIPTION OF THE DRAWINGS

The invention will now be described by way of example with reference to the accompanying drawings of which.

DETAILED DESCRIPTION OF THE EMBODIMENT

Figure 1:
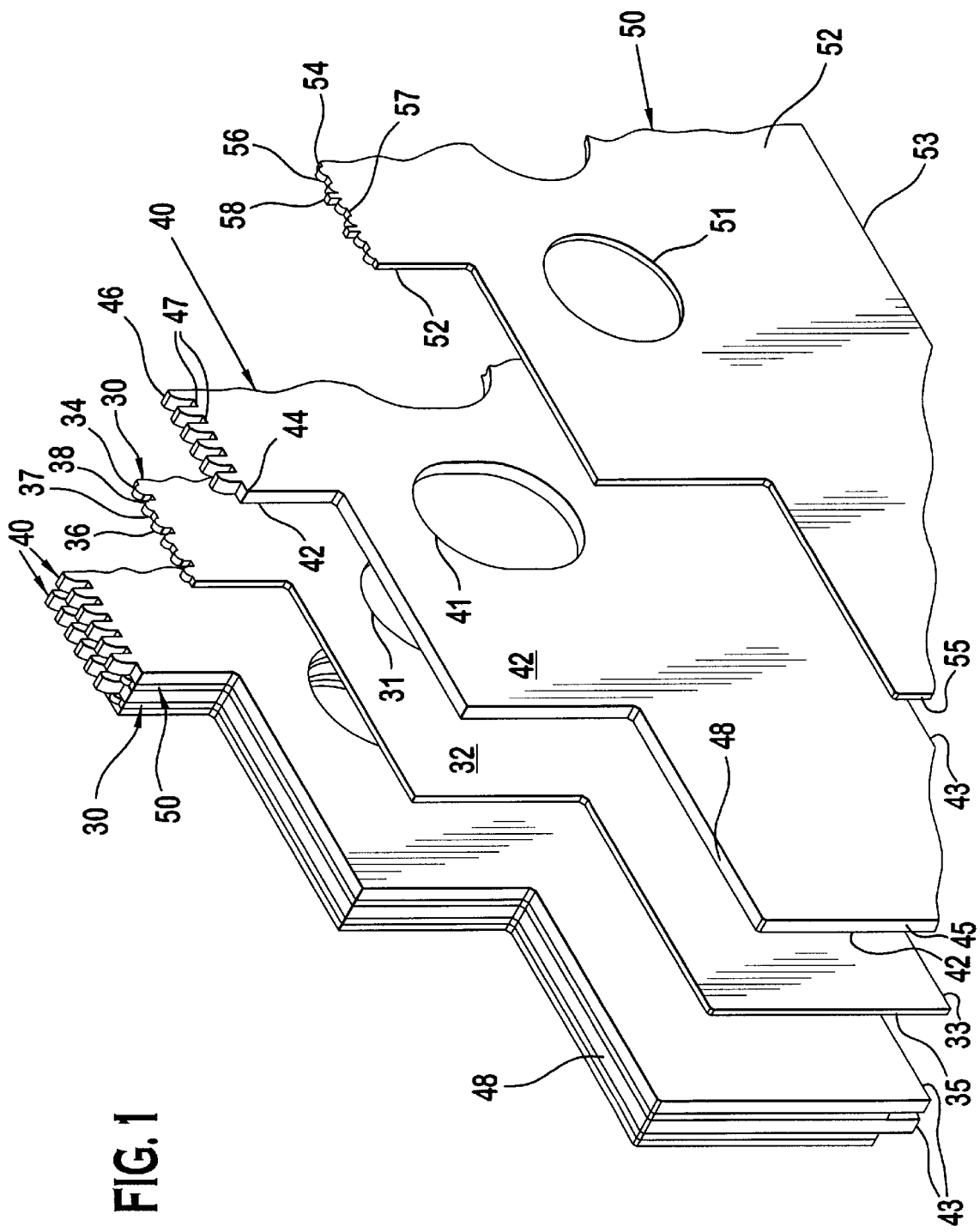
FIG. 1 shows a partial three dimensional exploded view of a series of profiled blades according to the present invention

The invention will first be described generally with reference to FIG. 1. Here it can be seen that a series of planar blades 30, 40, 50 are stacked together to form a surface consisting of edges 34, 44, 54. These edges 34, 44, 54 are stacked together to form a continuous surface as can be seen in the left side of FIG. 1. Each edge 34, 44, 54 represents a segment of a surface to be molded into an article. Once the planar blades 30, 40, 50 are stacked together, molten material can be flowed over their edges 34, 44, 54 to form the molded surface of the article. A selected number of blades have features which allow them to be articulated for ejecting the article from the mold 20 upon curing.

Each of the major components of the mold 20 will now be described in greater detail. First, with reference to FIG. 1, there are shown three types of planar blades 30, 40, 50. It should be understood that while three types of blades are shown here, the number of different blades which can be used is variable and may be increased or decreased depending upon the complexity of the surface to be molded. It should also be understood that the blades, while preferably shown to be planar, could be formed in arcuate or other suitable shapes. Any shape which corresponds to a segment of the part to be molded would be suitable for forming the blade. Turning first to the planar blades 30, this blade consists of a pair of side surfaces 32, a bottom edge 33, a side edge 35 and a mold edge 34. A plurality of cooling holes 31 pass between the side surfaces 32. The mold edge 34 is profiled to be a negative image of a linear portion of the surface to be molded. The profile is generated by making a cross section of the part to be molded. Features included along the mold edge 34 include semicircular projection 36, a openings 38, and flat sections 37. The semicircular projections 36 will result in a semicircular recess in the molded surface. The openings 38 will result in a projection or pin on the molded surface. The flat sections 37 will result in a flat section along the molded surface.

Similarly, the planar blade 40 has a pair of side surfaces 42, a bottom edge 43, a side edge 45 and a mold edge 44. A plurality of cooling holes 41 pass between the side surfaces 42. Here, the mold edge 44 has flat sections 47 and projections 46 being shaped as a curved surface on one side and a straight surface on an opposite side. Similarly, the projections 46 will result in recesses formed in the molded surface. Planar blades 50 consist of side surfaces 52, a bottom edge 53, and a mold edge 54. A plurality of cooling holes 51 pass between the side surfaces 52. Here, the mold edge 54 has similar semicircular projections 56, and flat sections 57. Pins 58 project from flat sections 57 to form passageways in the molded surface. As will be described below, selected blades may be formed as articulating blades. These selected blades are formed with extended bottom edges which are slightly longer than the rest of the bottom edges 33, 43, 53. Additionally, these articulating blades are formed with eject pin engaging surfaces 48 which project beyond adjacent blade surfaces.

Figure 2:
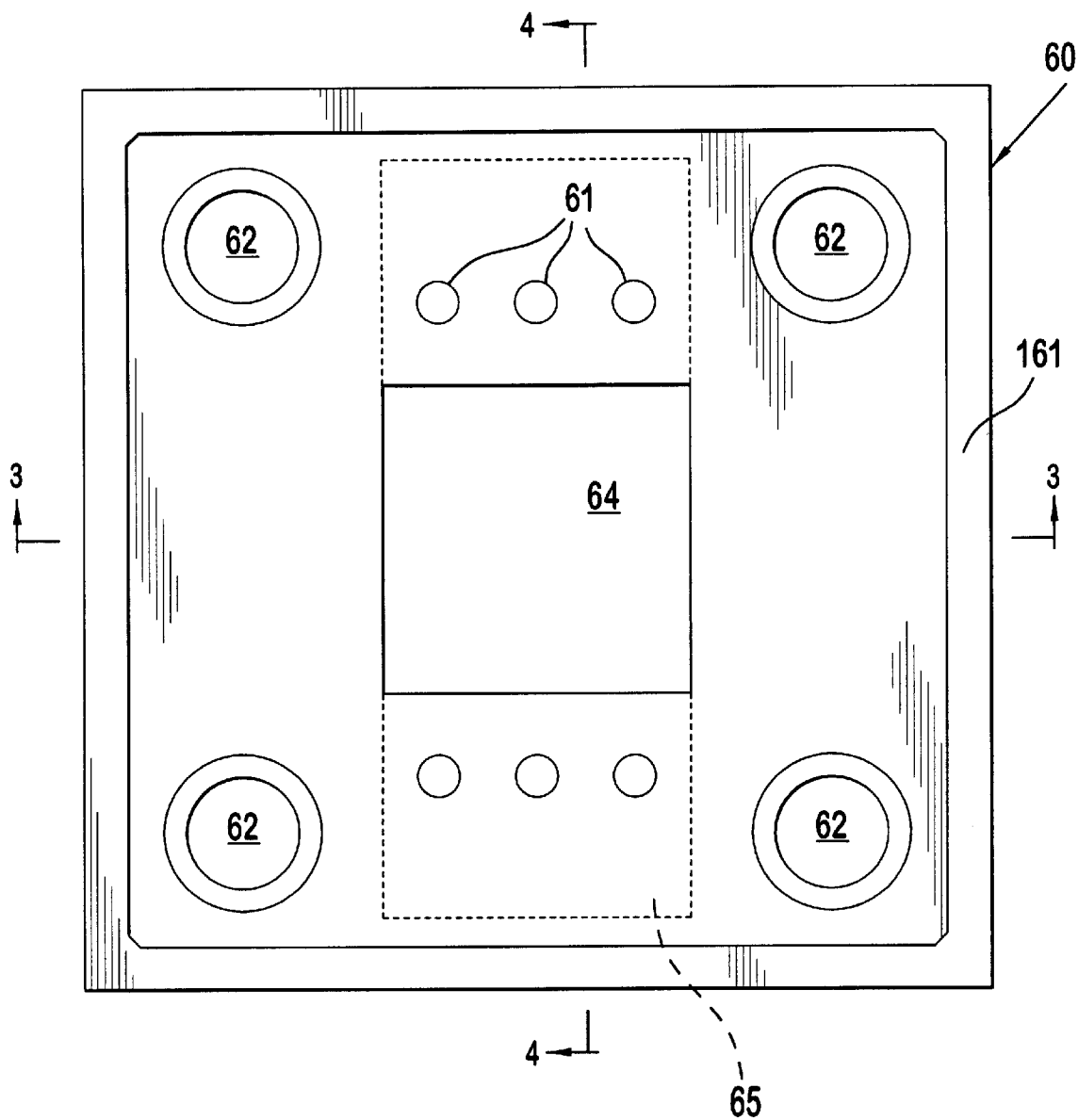
FIG. 2 shows a top view of a mold holder having a cavity for receiving the profiled blades of FIG. 1.
Figure 3:
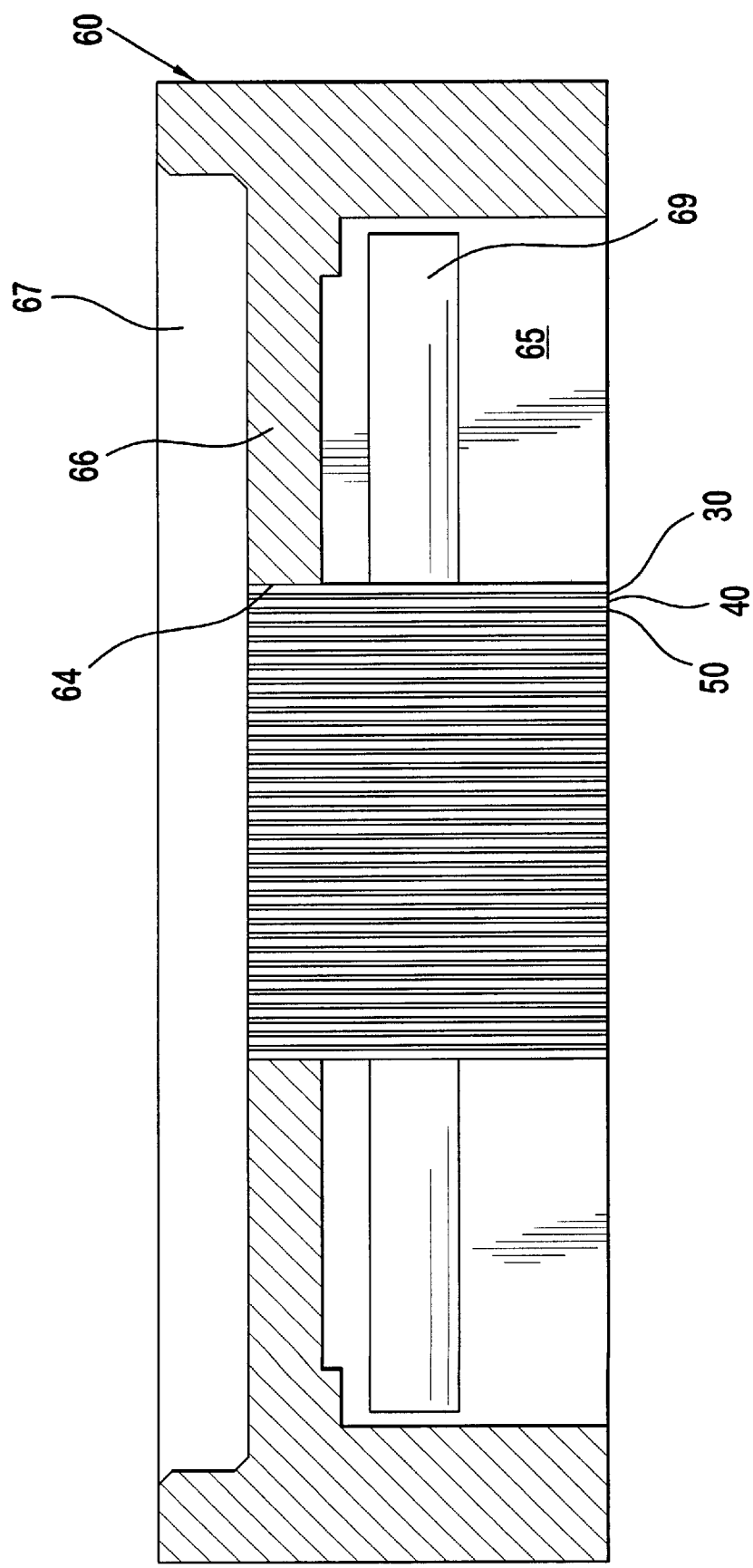
FIG. 3 shows a cross sectional view of the mold taken along the line 3—3 of FIG. 2 having the profiled blades of FIG. 1 inserted into the cavity.

The mold body 60 will now be described in greater detail with reference to FIG. 2. This figure shows a top view of the mold body 60. It consists of an outer wall 161 which surrounds a blade receiving cavity 64. A rear cavity 65 is disposed below the blade receiving cavity 64. A plurality of fastener receiving openings 62 are disposed around the mold body 60 and pass therethrough. Turning now to FIG. 3, it can be seen that the blade receiving cavity 64 is formed in a wall 66 which separates a mold receiving opening 67 from the rear cavity 65. A plurality of cooling tubes 69 are disposed within the rear cavity 65 and pass through the cooling holes 31, 41, 51 in the plurality of planar blades 30, 40, 50.

Figure 4:
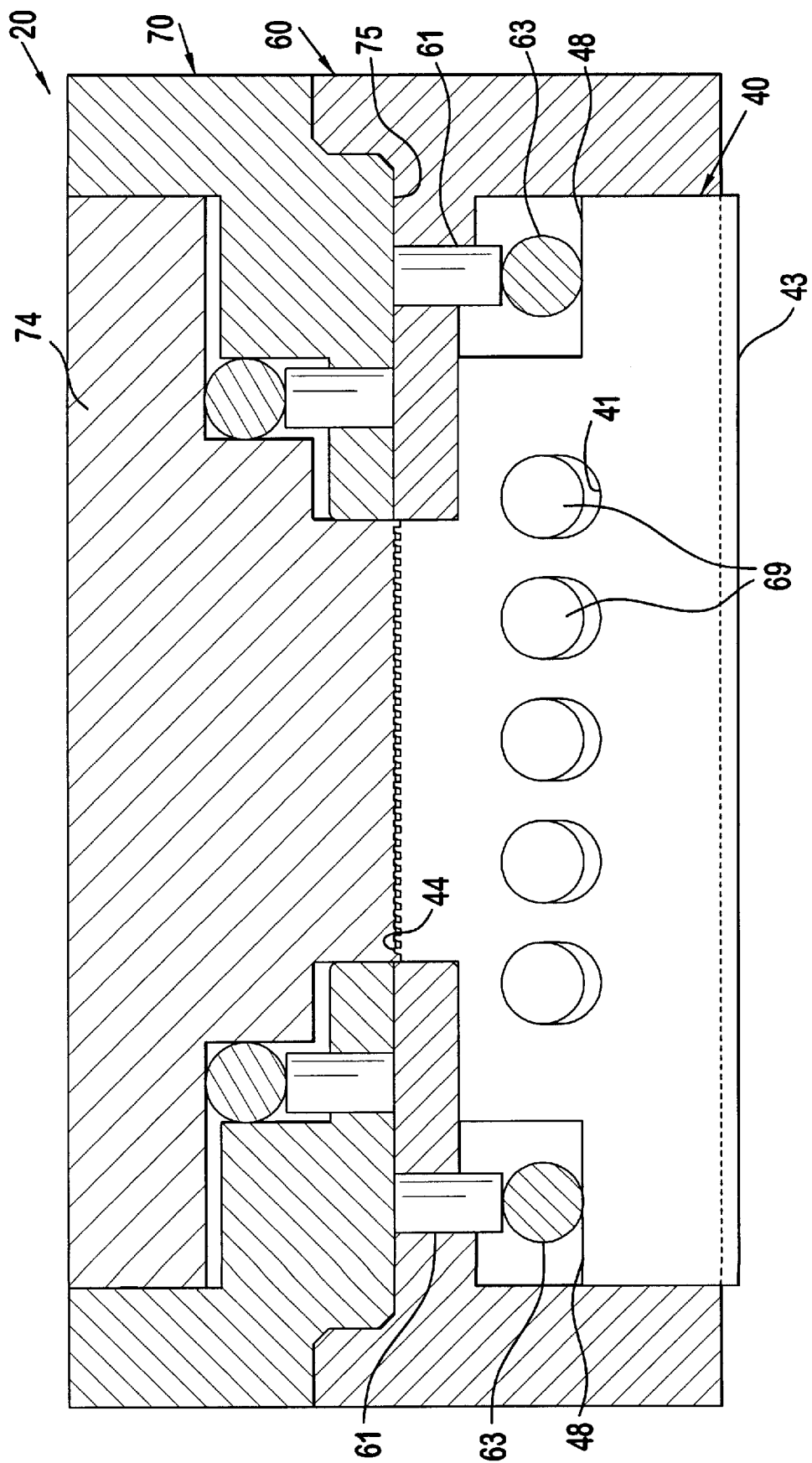
FIG. 4 shows a cross sectional view of the mold taken along the line 4—4 of FIG. 2 having the profiled blades of FIG. 1 inserted into the cavity.
Figure 5:
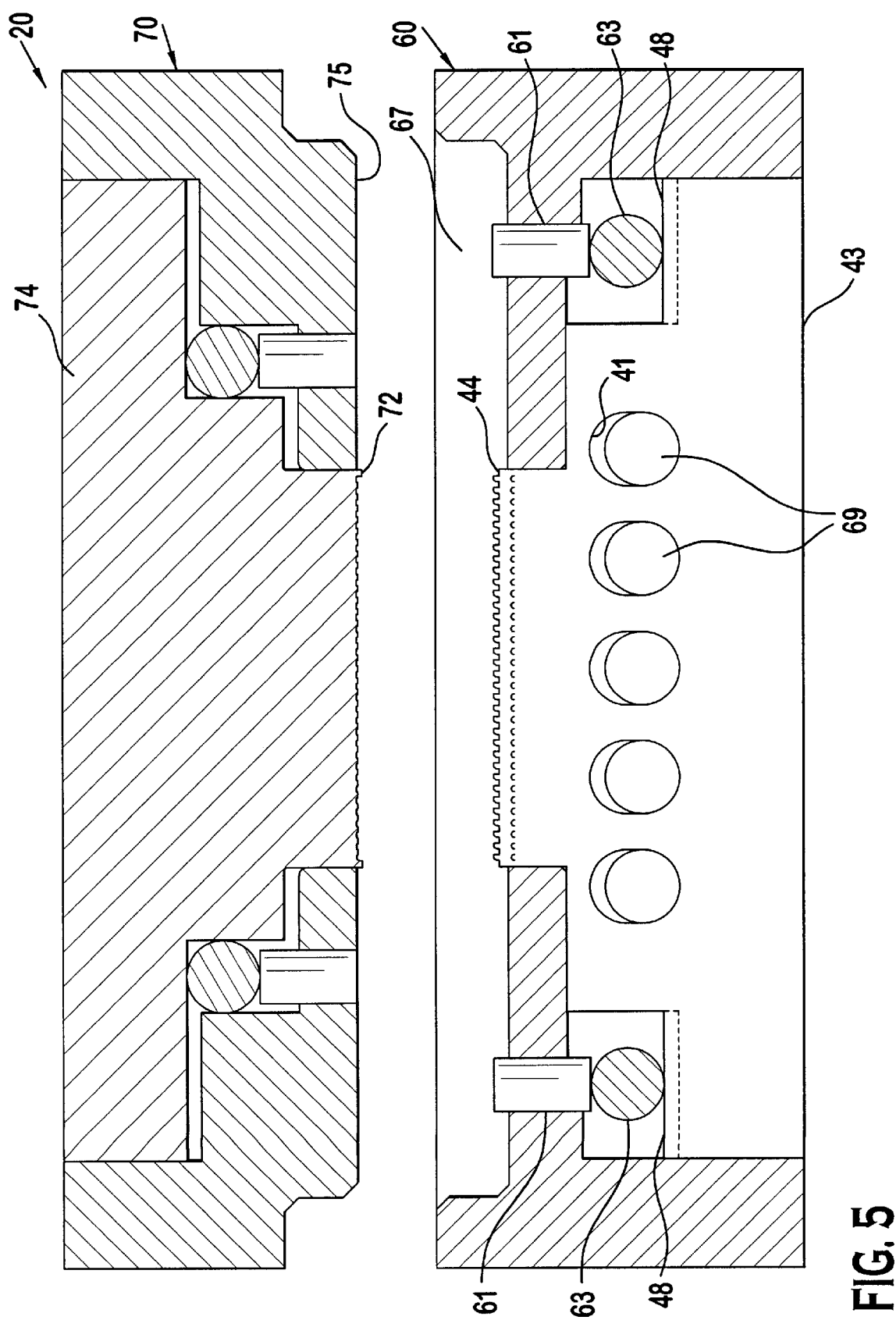
FIG. 5 shows a cross sectional view also taken along the line 4—4 of FIG. 2 showing an articulated profiled blade.

Certain ones of the planar blades 30, 40, 50 may be articulated, that is, movable toward and away from the molded surface in order to eject the article after curing of a molten material which was previously injected into the mold 20. An articulating mechanism according to the present invention is best seen in FIGS. 4 and 5. The articulating mechanism consists of eject rods 61, eject pins 63 and the articulating blade 40. The eject rods 61 are slidably disposed in the wall 66. The eject pins 63 are positioned in the rear cavity 65 and extend across the blade receiving cavity 64 transverse to the eject rods 61. The articulating blade 40 features elongated oval holes 41 extending therethrough and pin engaging surfaces 48.

Turning to FIG. 4, the articulated blade 40 is shown in a ready to mold position. In this position, the mold edge 44 is recessed from the mold receiving opening 67 and the bottom edge 43 projects beyond the end of the mold body 60. This blade 40 will be urged into this position upon mating of the complementary mold half 70 with the mold body 60. Pins 63 extending into the mold receiving cavity 67 (as shown in FIG. 5) serve to urge the blade 40 rearwardly upon mating of the complementary mold half 70 with the mold body 60. The leading edge 75 urges ejection rods 61 against the pins 63 and the pin engaging surface 48 of the blade 40 when the complementary mold half 70, and mold body 60 are closed together as shown in FIG. 4. In order to articulate the blade 40 in the opposite direction, a force is applied to the bottom edge 43 which is extended beyond the mold body 60 (FIG. 5) to urge the blade 40 into the mold receiving cavity 67.

It should be noted here that while a description of an articulating mechanism has been provided here with respect to the blade 40, any of the blades 30, 40, 50 could be articulated in the same manner. Depending on the complexity and surface area of normal surfaces to be molded, the number and position of articulated blades may be adjusted. For example, if a particular blade contains many pin features like pin feature 58, a molded article may tend to adhere to such mold features after curing. Therefore, it may be desirable to articulate each blade which is adjacent to such features to eject the cured article. It should also be noted that the entire detailed description of the mold body 60 and blades 30, 40, 50 applies equally to the complementary mold half 70. Therefore, a detailed description of the the complementary mold half 70 would be duplicative and will not be provided here.

Assembly and operation of the mold 20 will now be described in greater detail. First, a surface to be molded into an article must be segmented into a plurality of discrete linear segments. The profile of each linear segment is then generated on a mold edge 34, 44, 54 of a respective blade 30, 40, 50. It should be understood that the profile may be generated by any suitable technique such as stamping, grinding, milling, or wire electric discharge machining (EDM). Each of the blades 30, 40, 50 are formed of a sheet of metal having a thickness corresponding to the width of the linear segment. Several of the blades 30, 40, 50 are selected to be articulating blades. These articulating blades are cut to be slightly longer than the rest. Additionally, the articulating blades have elongated oval holes 41 stamped therethrough to receive cooling tubes 69 and pin engaging surfaces 48 are formed to engage ejection pins 63 which pass through the mold 20 along the blades 30, 40, 50. All of the blades 30, 40, 50 are then stacked together so that their mold edges 34, 44, 54 are adjacent to each other. Eject rods 61 are inserted into openings in the mold body wall 66 and extend to engage eject pins 63. The eject pins 63 are inserted into the rear cavity 65 and positioned to be engageable with pin engaging surfaces 48 of the articulating blades. The stacked blades 30, 40, 50 are tightly secured into a blade receiving cavity 64 of a mold body 60. Cooling tubes 69 are inserted through the cooling holes 31, 41, 51 in the stacked blades 30, 40, 50 to complete the assembly.

In operation, the mold body 60 and complementary mold half 70 are joined together to close the mold 20. Molten material is injected by well know techniques into the area between the mold surfaces 34, 44, 54 and mold surfaces of the complementary mold half 70. Cooling fluid or air is passed through the cooling tubes 69 to cure or solidify the molten material. The mold body 60 is separated from the complementary mold half 70 and the molded article is ejected by applying a force to the bottom edge 33, 43, or 53 of selected articulated blades 30, 40, 50.

An advantage of the invention is that it provides a mold and method of forming a mold 20 which does not require complex, labor intensive machining processes to form mold plates and core pins. Additionally, since the mold 20 is assembled from segmented linear portions formed on mold edges 34, 44, 54 of blades 30, 40, 50, changes to portions of the mold 20 can be made easily by replacing selected blades 30, 40, 50 instead of machining a mold plate.

I claim:

1. A mold comprising:
   a mold body having a mold cavity,
   a plurality of blades stacked in the mold cavity and oriented so that mold edges of the blades together form a surface to be molded wherein at least one blade has a bottom edge extending beyond bottom edges of the rest of the blades opposite the mold edges, the at least one blade being slidable relative to the rest of the blades and having an eject pin engaging surface disposed adjacent the mold edge and opposite the extended bottom edge.

2. The mold as recited in claim 1 further comprising a plurality of cooling tubes passing through holes in the plurality of blades.

3. The mold as recited in claim 2 wherein the holes in the at least one blade are elongated oval holes.

4. The mold as recited in claim 1 further comprising at least one eject pin disposed in the mold cavity in engagement with the eject pin engaging surfaces.

5. The mold as recited in claim 4 further comprising eject rods slidably disposed in a wall of the mold cavity in engagement with the eject pin.

6. The mold as recited in claim 5 wherein the eject rods extend from the wall beyond a mating face of the mold body.

7. A mold comprising:
   a mold body and a complementary mold half defining a mold cavity therebetween;
   the mold body having a plurality of blades stacked and oriented so that mold edges of the blades are adjacent the mold cavity and together form a surface to be molded; and
   at least one of the plurality of blades having a bottom edge opposite the mold edge extending beyond bottom edges of the rest of the plurality of blades, wherein the at least one of the plurality of blades is slidable relative to the rest of the plurality of blades and has an eject pin engaging surface disposed adjacent the mold edge and opposite the extended bottom edge.

* * * * *